United States Patent
Gruen et al.

(10) Patent No.: US 8,146,003 B2
(45) Date of Patent: Mar. 27, 2012

(54) EFFICIENT TEXT INPUT FOR GAME CONTROLLERS AND HANDHELD DEVICES

(75) Inventors: Robert Gruen, Bellevue, WA (US); Richard L. Hughes, Monroe, WA (US); Jessica Miller, Jacksonville, FL (US)

(73) Assignee: Microsoft Corporation, Redmond, WA (US)

( * ) Notice: Subject to any disclaimer, the term of this patent is extended or adjusted under 35 U.S.C. 154(b) by 1257 days.

(21) Appl. No.: 11/840,479

(22) Filed: Aug. 17, 2007

(65) Prior Publication Data

US 2009/0048020 A1  Feb. 19, 2009

(51) Int. Cl.
G06F 15/00 (2006.01)
G06F 13/00 (2006.01)

(52) U.S. Cl. .................................. 715/756; 715/810

(58) Field of Classification Search .................. 715/773, 715/764, 702, 810, 835, 863, 756
See application file for complete search history.

(56) References Cited

U.S. PATENT DOCUMENTS

| | | | |
|---|---|---|---|
| 5,543,818 A * | 8/1996 | Scott | 345/168 |
| 6,512,511 B2 | 1/2003 | Willner et al. | |
| 6,897,849 B2 * | 5/2005 | Kim | 345/160 |
| 7,116,311 B2 | 10/2006 | Martinez et al. | |
| 7,171,498 B2 | 1/2007 | Tu et al. | |
| 7,199,786 B2 | 4/2007 | Suraqui | |
| 7,706,616 B2 * | 4/2010 | Kristensson et al. | 382/187 |
| 7,921,361 B2 * | 4/2011 | Gunn et al. | 715/256 |
| 2004/0080487 A1 * | 4/2004 | Griffin et al. | 345/156 |
| 2004/0196256 A1 | 10/2004 | Wobbrock et al. | |
| 2004/0224763 A1 | 11/2004 | Martinez et al. | |
| 2005/0085299 A1 | 4/2005 | Murzanski | |
| 2006/0119582 A1 | 6/2006 | Ng et al. | |
| 2007/0016572 A1 | 1/2007 | Bates et al. | |
| 2009/0066648 A1 * | 3/2009 | Kerr et al. | 345/158 |

OTHER PUBLICATIONS

Wilson, et al. "Text Entry Using a Dual Joystick Game Controller" (2006) CHI ACM, 4 pages.
Meyers, et al. "Text Input to Handheld Devices for People with Physical Disabilities" (2005) 11th International Conference on Human-Computer Interaction, 9 pages.
Wobbrock, et al. "Writing with a Joystick: A Comparison of Date Stamp, Selection Keyboard, and EdgeWrite" (2004) Canadian Human-Computer Communication Society, 8 pages.
"Quickwriting for the XBox" http://mrl.nyu.edu/~perlin/experimentd/xq last viewed Jun. 5, 2007, 1 page.

* cited by examiner

*Primary Examiner* — Kevin Nguyen
(74) *Attorney, Agent, or Firm* — Lee & Hayes, PLLC

(57) ABSTRACT

The claimed subject matter provides a system and/or a method that facilitates entering a character via an input device. An interface can receive a portion of input data from an input device, wherein the input data is at least one of an analog input from an analog directional input associated with the input device or a button input from a button associated with the input device. An enhanced input component can utilize a user interface (UI) overlay corresponding to the input device to select a character in which the UI overlay includes a segmented ring with each sector having two or more characters. The enhanced input component can enter a character for data entry based upon an analog directional input that selects a sector on the segmented ring and a button input that selects a corresponding character within the segment.

20 Claims, 10 Drawing Sheets

EFFICIENT TEXT INPUT FOR GAME CONTROLLERS AND HANDHELD DEVICES

BACKGROUND

Modern game-play devices have developed capabilities of powerful computers as integrated circuit technology has become more advanced and incorporated into such game-play devices. Where traditional game-play devices ran exclusively on removable media, such as floppy discs, compact discs (CDs), digital video discs (DVDs), etc., and interaction with such games was solely by way of a joystick or other game control device, modem game-play systems are not so limited. Rather, a modern device can utilize powerful network and computing applications such as e-mail, instant messaging, web browsing, digital video recording, and the like. Additionally, gaming has progressed to an online arena, where players can synchronize their gaming systems with other players via an online server, and communicate, coordinate, and interface with other remote players while playing a game. Typically, such communication and coordination, as well as game registration and character setup, requires some type of information exchange, most notably voice over Internet protocol (VoIP) chat and/or text chat. For instance, chat in video games are VoIP implemented, whereas text usage on a gaming console can be utilized for email, web browsing, chat, etc.

Text chat has become an important aspect of modern video game consoles, including gaming consoles that facilitate online gaming. Traditional text chat implementations include text entry methods similar to entry of characters via a computer keyboard or similar keypad device. Such devices are collectively termed virtual keyboards (VKs). A VK device facilitates text entry by providing an onscreen replica of a physical keyboard (or similar key-pad device) and a selection cursor mapped to buttons on a game controller or joystick. A user can select individual characters by moving a cursor via joystick buttons, or other input segments, to a particular key of the VK representing a character and selecting that particular key (e.g., by pressing an accept button). Moving the cursor via the game controller or joystick to subsequent keys and selecting those keys facilitates selection of additional characters. However, this text selection method and/or input paradigm was designed for different devices (e.g., computer keyboards, physical computer keyboards, etc.) than game controllers, and is not always an efficient means to enter text by way of such a console. More specifically, such a device can be slow and tedious, as a cursor is typically moved from one key to another subsequent each selection. Furthermore, because each selection is based on a relative position of a key to a prior selected key (or prior position of a cursor), a user is required to view the VK display in order to enter text, often distracting them from concurrent computing activities (e.g., responding to game stimuli). Consequently, eyes-off input is very difficult, and visual distraction associated with VK devices is difficult to avoid.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate efficiently inputting data utilizing an input device. An enhanced input component can receive at least one analog directional input and a button input via an interface, wherein the enhanced input component can utilize a user interface (UI) overlay to input data characters for efficient data entry. The UI overlay can include at least one segmented ring with sectors having two or more characters populated therein. In other words, the UI overlay can have a segmented ring with various sectors in which each sector can include a subset of characters for data entry. An input device can interact with the enhanced input component in order to select a sector on the segmented ring and a character within the sector with the analog directional input and button input respectively.

The enhanced input component can utilize the UI overlay to map a character input to a data input on the input device efficiently with minimal keystrokes (e.g., input device actions, input device gestures, data inputs, directional inputs, button inputs, etc.). For example, the enhanced input component can receive any data input from numerous input devices independent of type, format, brand, etc. In general, the enhanced input component can enable a user to input characters with two keystrokes and/or actions. The input device can be a gaming controller, a controller related to a gaming console, a keypad, an input device with an analog directional input and at least two button inputs, a steering wheel gaming controller, a mobile device, a mobile communication device, a cellular phone, a handheld, a portable gaming device, a handheld gaming device with an incorporated controller, etc. In other aspects of the claimed subject matter, methods are provided that facilitate minimizing keystrokes for data entry via an input device.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
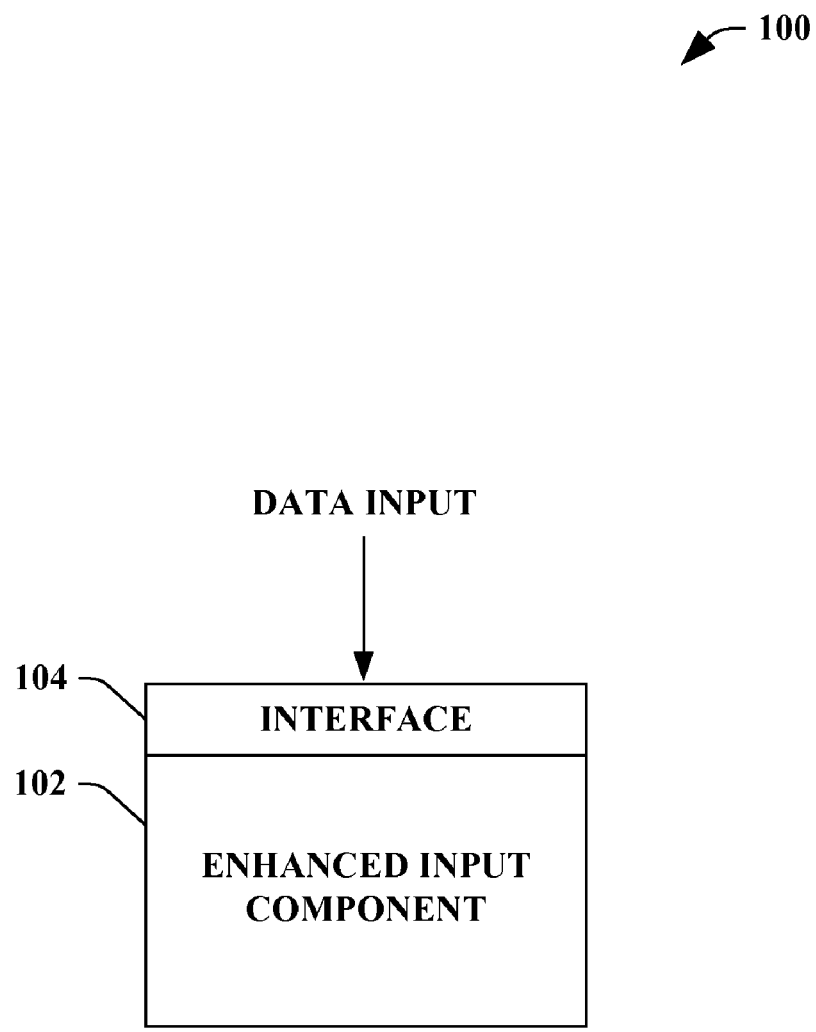
FIG. 1 illustrates a block diagram of an exemplary system that facilitates efficiently inputting data utilizing an input device.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "device," "generator," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive. . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates efficiently inputting data utilizing an input device. The system 100 can include an interface 104 (discussed in more detail below) that can receive input data associated with an input device (not shown), wherein an enhanced input component 102 can employ a user interface (UI) overlay with a segmented ring in which the input data can select a character for data entry. In particular, the enhanced input component 102 can utilize a UI overlay that includes a segmented ring having two or more characters within each segment and/or sector of such ring. The enhanced input component 102 can receive an analog directional input (e.g., a first data input) that selects a segment/sector of the ring and a button input (e.g., a second data input) that selects a character within the subset of characters (e.g., two or more characters within the segment/sector). Thus, the enhanced input component 102 can receive at least two data inputs that correspond to a UI overlay in which the two data inputs identify a segment and/or sector on a segmented ring and a character within such segment and/or sector. It is to be appreciated that the UI overlay can be specific to the particular input device. Thus, the enhanced input component 102 can employ various UI overlays that map data inputs to various characters based upon the input device. It is to be appreciated that the enhanced input component 102 can utilize a UI overlay that includes any suitable number of rings (e.g., number of rings R, where R is a positive integer), any suitable number of sectors partitioned on the ring (e.g., number of sectors S, where S is a positive integer), and any suitable number of characters and/or character sets (e.g., number of characters C, where C is a positive integer; number of character sets CS, where CS is a positive integer).

For example, an input device can be any suitable device, component, etc. that can facilitate data entry, wherein the input device can include at least one analog directional input and two or more button inputs (discussed in more detail below). The enhanced input component 102 can evaluate the input device and generate and/or utilize a UI overlay that corresponds therewith. With the input device identified, the enhanced input component 102 can utilize a segmented ring with sectors including two or more characters for the specifically generated UI overlay. With the UI overlay and input device, data entry can be greatly optimized based on reducing the number of keystrokes (e.g., data inputs, directional inputs, button inputs, etc.) required for character entry. Moreover, it is to be appreciated that a keystroke can include an analog input from an input device, controller, etc. For instance, utilizing conventional virtual keyboards required a plurality of keystrokes to enter the character "a" and then the character "t." With the claimed subject matter, the number of keystrokes can be reduced to two (2) based on a first analog input (e.g., selecting a sector on the segmented ring) and a second button input (e.g., selecting a character within the sector). It is to be appreciated and understood that the position of the characters in the segment can match the position of the buttons that selected such characters.

In another example, the input device can include two button inputs (e.g., button RED and button BLUE) and an analog directional input (e.g., a steering wheel, a joystick, an analog stick, etc.). The enhanced input component 102 can implement a UI overlay specific to the input device (e.g., a UI overlay specific to an input with an analog input and two button inputs), wherein the UI overlay includes a segmented ring having sectors populated with two or more characters. The analog directional input can select/identify a sector on the segmented ring to indicate a set of characters that are desired to be entered. Based on the number of input buttons for this particular input device (e.g., two button inputs), there can be two characters within each sector on the segmented ring. Thus, upon selecting a sector on the ring, the button inputs can correlate to a character for entry (e.g., button RED corresponds to a first character, button BLUE corresponds to a second character). As the analog directional input selects disparate sectors on the ring, the button inputs can correspond to disparate characters for entry. For instance, a first sector selected can correspond to a first character and a second character and a second sector can correspond to a third character and a fourth character. It is to be appreciated that the characters can be grouped in any particular grouping amongst the sectors. It is to be further appreciated and understood that the number of characters within a sector can correlate with the number of button inputs on the input device. Thus, if an input device can utilize 5 button inputs in which the enhanced input component 102 can employ a UI overlay with a segmented ring with each sector having up to five (5) characters.

In another example, the enhanced input component 102 can receive a first motion input (e.g., a first data input) that selects a segment/sector of the ring and a second motion input (e.g., a second data input) that selects a character within the subset of characters (e.g., two or more characters within the segment/sector). Thus, the enhanced input component 102 can receive at least two motion-related data inputs that correspond to a UI overlay in which the two motion-related data inputs identify a segment and/or sector on a segmented ring and a character within such segment and/or sector. For instance, the motion input can be detected by the input device using a motion sensor, a gyroscope technique, a gestural selection, a motion on a touch screen, or any other suitable motion detection technique that can interact with the UI overlay.

In addition, the system 100 can include any suitable and/or necessary interface component 104 (herein referred to as "interface 106"), which provides various adapters, connectors, channels, communication paths, etc. to integrate the enhanced input component 102 into virtually any operating and/or database system(s) and/or with one another. In addition, the interface 104 can provide various adapters, connectors, channels, communication paths, etc., that provide for interaction with the enhanced input component 102, data input, and any other device and/or component associated with the system 100 (e.g., gaming device, gaming console, handheld device, mobile device, mobile communication device, input device, etc.).

Figure 2:
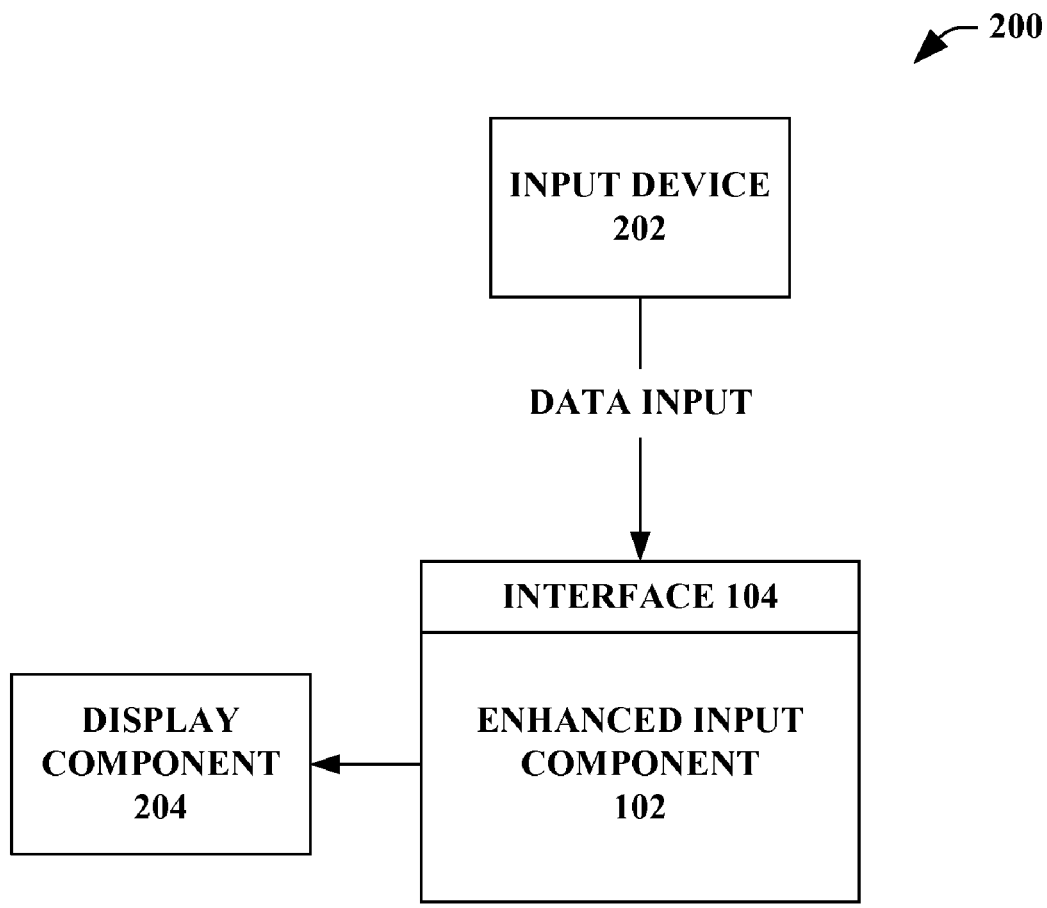
FIG. 2 illustrates a block diagram of an exemplary system that facilitates minimizing keystrokes for data entry via an input device.

FIG. 2 illustrates a system 200 that facilitates minimizing keystrokes for data entry via an input device. The system 200 can include the enhanced input component 102 that can utilize a UI overlay with input device specific mapping for data entry based at least in part upon data input received via the interface 104. The enhanced input component 102 can receive at least two data inputs, wherein a first data input can be an analog directional input and a second data input can be a button input. It is to be appreciated that the first data input and the second data input can correlate to the UI overlay employed by the enhanced input component 102. As discussed, the UI overlay can include a segmented ring with two or more sectors with each sector having two or more characters. With such configuration, the system 200 improves data entry by limiting character input to two keystrokes (e.g., the first data input and the second data input). The system 200 can allow users to have a maximum cost of two keystrokes per character (e.g., three for characters from different character sets). Preliminary results with the subject innovation indicate a five-fold increase in text/character input speed over existing VK techniques. The UI interface and enhanced input component 102 can provide extremely intuitive implementation.

The enhanced input component 102 can receive the data input from an input device 202. It is to be appreciated that the input device 202 can be any suitable data input device that utilizes one or more analog directional inputs and at least two or more button inputs. For example, the input device 202 can be, but is not limited to, a gaming controller, a controller related to a gaming console, a keypad, an input device with an analog input and at least two button inputs, steering wheel gaming controller, a mobile device, a mobile communication device, a cellular phone, a handheld, a portable gaming device, a handheld gaming device with incorporated controller, etc. For example, the input device 202 can include a left analog directional input (e.g., a thumb stick), a right analog directional input (e.g., a thumb stick), a directional pad (e.g., utilizing four button inputs in a top, down, left, right configuration), a back button, a start button, a set of four primary buttons (e.g., "X," "Y," "A," and "B"), a left shoulder (e.g., bumper) button, a right shoulder (e.g., bumper) button, a right trigger button, a left trigger button, and a guide button. In another example, the input device 202 can include a left analog stick (e.g., a thumb stick), a right analog stick (e.g., a thumb stick), a directional input (e.g., utilizing four button inputs in a top, down, left, right configuration), a select button input, a start button input, a set of four primary buttons (e.g., a square button, a triangle button, an "X" button, and a circle button), a left shoulder button (e.g., an "L1" button), a right shoulder button (e.g., an "R1" button), a left trigger button (e.g., an "L2" button), a right trigger button (e.g., an "R2" button), and an analog stick button (e.g., depressing an analog stick) technique for each analog stick (e.g., "R3," "L3").

In another example, the input device 202 can be a portable handheld gaming device with incorporated gaming controls. Thus, the portable handheld can include a left shoulder button, a right shoulder button, an analog thumb stick, a directional input (e.g., a set of four button inputs in a top, down, left, right, configuration), a set of primary buttons, as well as incorporating computing components/hardware/software (e.g., display, memory, processor, etc.). In still another example, the input device can be a steering wheel gaming controller/device. The steering wheel gaming controller/device can include a steering wheel (e.g., an analog directional input), a directional input, a paddle shifter, a pedal, and a set of primary buttons. In still another example, the input device 202 can be a mobile device. The mobile device can include a thumb stick (e.g., for analog directional input), a primary button, a navigation button, and a special key. It is to be appreciated that examples will be described in detail below for the various input devices.

The system 200 can further include a display component 204 in which the input device 202 can interact with the generated UI overlay. For example, the display component can be a screen, a touch screen, a monitor, a liquid crystal display (LCD), a television, a plasma television, a projection component, a dot matrix display, an analog electronic display, a digital electronic display, a nano crystal display, a carbon nano tube display, a laser television, and/or any other suitable display that can render a portion of a graphic related to a UI overlay. In other words, the UI overlay can be rendered by the display component 204 to facilitate interaction with the input device for data entry.

It is to be appreciated that the enhanced input component 102 can be a stand-alone component (as depicted), incorporated into the input device 202, incorporated into a gaming console (not shown), incorporated into the display component 204, incorporated into the input device 202 and the display component 204, and/or any combination thereof. For example, for the instance in which the input device is a gaming controller, the enhanced input component 102 can be incorporated into the gaming controller, incorporated into the gaming console, incorporated into the display component 204, and/or any combination thereof. In another example, the input device 202 can be a portable handheld gaming device (e.g., with built in display, controls, inputs, etc.), wherein the enhanced input component 102 can be incorporated into such input device 202. For example, the display component 204 can be a touch screen that can be utilized by a gaming device. In such example, the gaming device can be a portable handheld gaming device with incorporated gaming controller for data entry, a gaming console with a gaming controller for data input, etc. The touch screen can be incorporated into a portable handheld gaming device in which the UI overlay can be displayed on the touch screen. Thus, data entry utilizing the UI overlay and segmented ring with character filled sectors can be implemented therewith. In other words, the character input technique utilized by the enhanced input component 102 can be directly on the UI overlay itself.

Figure 3:
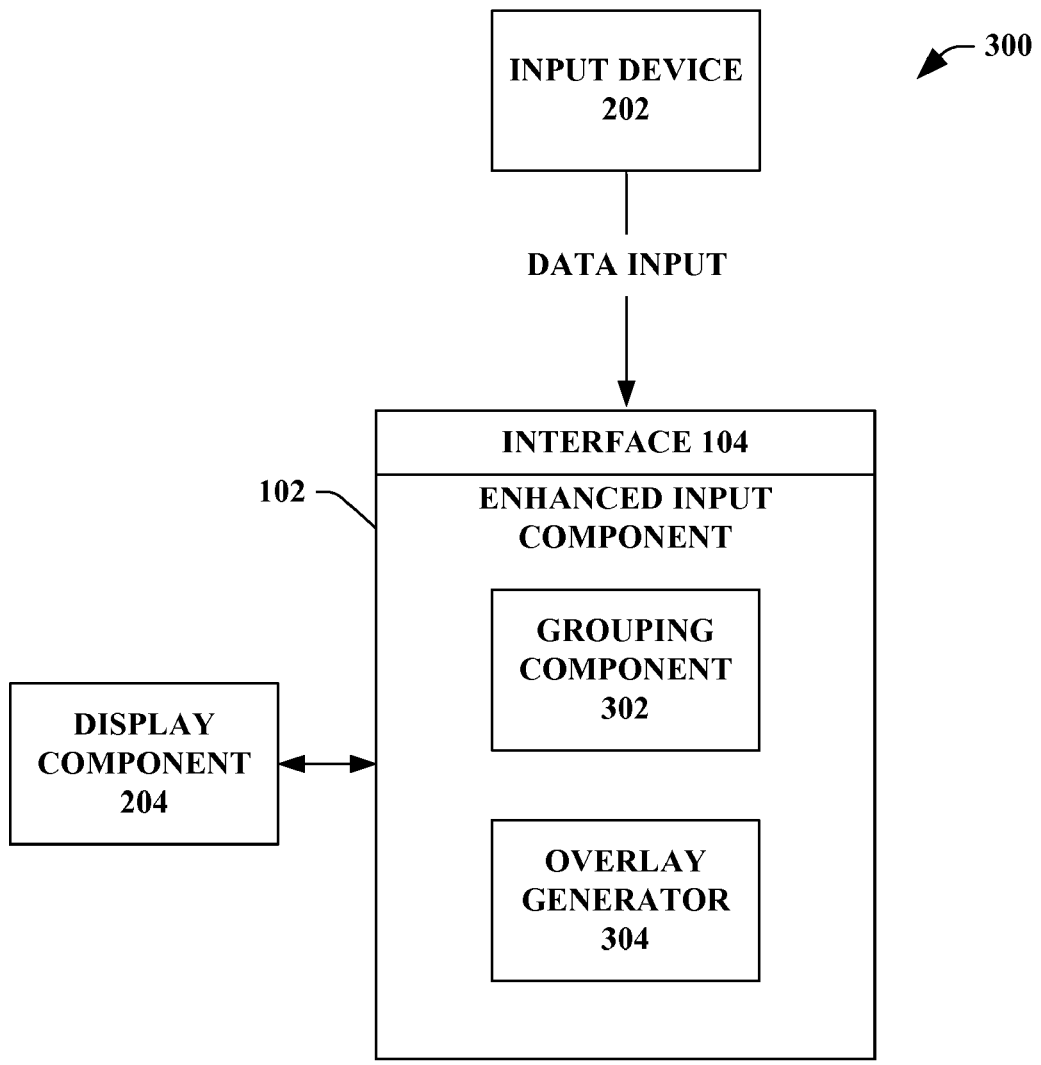
FIG. 3 illustrates a block diagram of an exemplary system that facilitates utilizing a UI overlay specific to an input device for data entry.

FIG. 3 illustrates a system 300 that facilitates utilizing a UI overlay specific to an input device for data entry. The system 300 can include the enhanced input component 102 that can receive a first analog data input and a second button data input to enable data entry and/or character selection. The enhanced input component 102 can enable the change of a selected button behavior based on an analog directional input positioning. Moreover, the enhanced input component 102 can employ the UI overlay with a specific layout of text/characters that corresponds to a particular input device 202. Within the UI overlay, a segmented ring can include two or more characters within a sector on the segmented ring in which each character can correspond to a button input.

The system 300 can include a grouping component 302 that can identify a grouping of characters to populate a sector and/or segment on a segmented ring. For example, the grouping component 302 can evaluate and/or collect data such as, but not limited to, input device, region, language associated with region, geographic data, user selected language, character sets, button inputs related to the input device 202, user preferences, user's configuration, and/or any other suitable data that can be utilized to identify an optimal grouping of characters, etc. Based on such data, the grouping component 302 can ascertain a number of characters to populate in an ascertained number of segments and/or sectors on the ring. Thus, the grouping component 302 can identify the number of rings, the number of segments and/or sectors on a ring, and/or the number of characters to populate within a segment and/or sector on a ring. For example, the grouping component 302 can identify an English speaking character set based on a user selection and ascertains a number of characters to populate within a determined number of sectors/segments on a ring.

The system 300 can further employ an overlay generator 304 that can create a UI overlay based at least in part upon the data collected and/or identified by the grouping component 302. The overlay generator 304 can create a UI overlay particular to the input device, include at least one segmented ring with two or more segments and/or sectors in which each segment and/or sector can include two or more characters. For example, the grouping component 302 can collect data that suggests two segmented rings, with each ring having seven sectors, with each sector having 4 characters. Thus, the overlay generator 304 can create a UI overlay for the specific device. In such example, the first ring can be selected by a first analog directional input to identify a segment and/or sector with characters, whereas the second ring can be selected by a second analog directional input to identify a character set (e.g., numbers, capital letters, lowercase, special characters, etc.).

Figure 4:
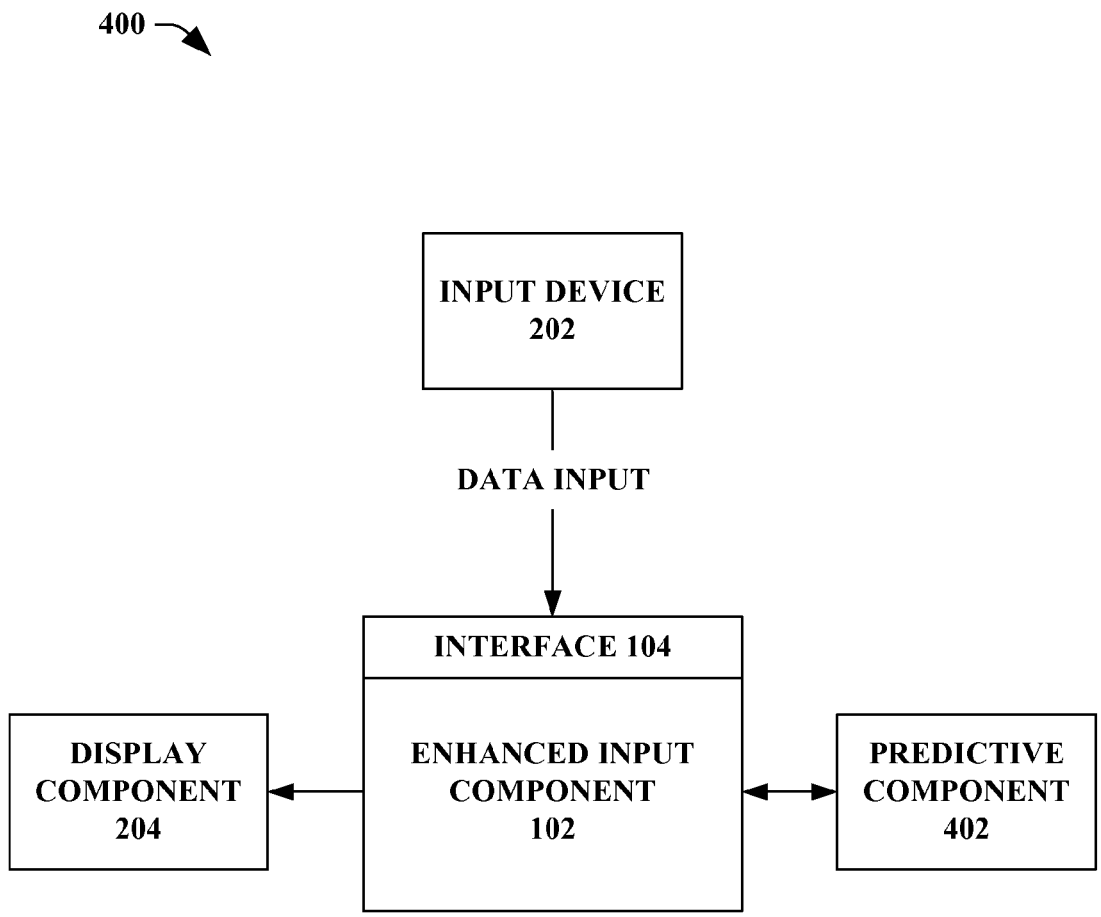
FIG. 4 illustrates a block diagram of an exemplary system that facilitates utilizing a predictive technique in connection with the claimed subject matter.

FIG. 4 illustrates a system 400 that facilitates utilizing a predictive technique in connection with the claimed subject matter. The system 400 can include the enhanced input component 102 that provides the translation of input on the input device 202 to actual character input (e.g., data entry). The enhanced input component 102 can further utilize UI feedback that can be presented to a user, wherein the UI can correspond to the input device 202 being employed. The UI employed can provide feedback such as a visual representation of character entry. In other words, the UI can allow a user to see the character mappings and current selections based on inputs received via the input device 202. Moreover, the UI generated by the enhanced input component 102 can allow a "look ahead" feature, in which a next character can be found while their fingers execute the movements (e.g., activate analog and/or button inputs) for typing the current character.

In accordance with an additional aspect of the claimed subject matter, the system 400 can utilize predictive text mechanisms/techniques in conjunction with the enhanced input component 102, as described, to further facilitate accurate and efficient text entry. For instance, predictive component 402 can reference a source of words, phrases, sentences, etc. related to a particular language, alphabet, dialect or the like, or, for instance, a prior text history of a user, and provide possible complete words, phrases, sentences, etc. consistent with selected characters. For example, if a user selects letters 't' and 'h' utilizing mechanisms/techniques substantially similar to those described herein, the predictive component 402 can ascertain, for instance, the words 'the', 'there', 'these', and other words beginning with 't'-'h' are expected to be entered and/or inputted and further display such predictions on the display component 204. In another example, a user can scroll through a list of words displayed on the display component 204 by the predictive component 402, and select a particular word with an acceptance input (not shown) of input device 202. Additionally, the predictive component 402 can reference words of a sentence entered, and offer additional words to complete a sentence or phrases based upon, for example, common sentences, phrases, expressions, prior words, phrases, and sentences entered by a user (e.g., a user text entry history). A user can select an offered word, sentence, or phrase with an acceptance input. Upon receiving such acceptance input for a particular word, phrase, sentence, etc., the predictive component 402 can enter such word, phrase, or sentence. It is to be appreciated (as discussed below) that the predictive component 402 can utilize historic data and tendencies of specific users to further enhance and/or optimize data entry and predictive capabilities.

Figure 5:
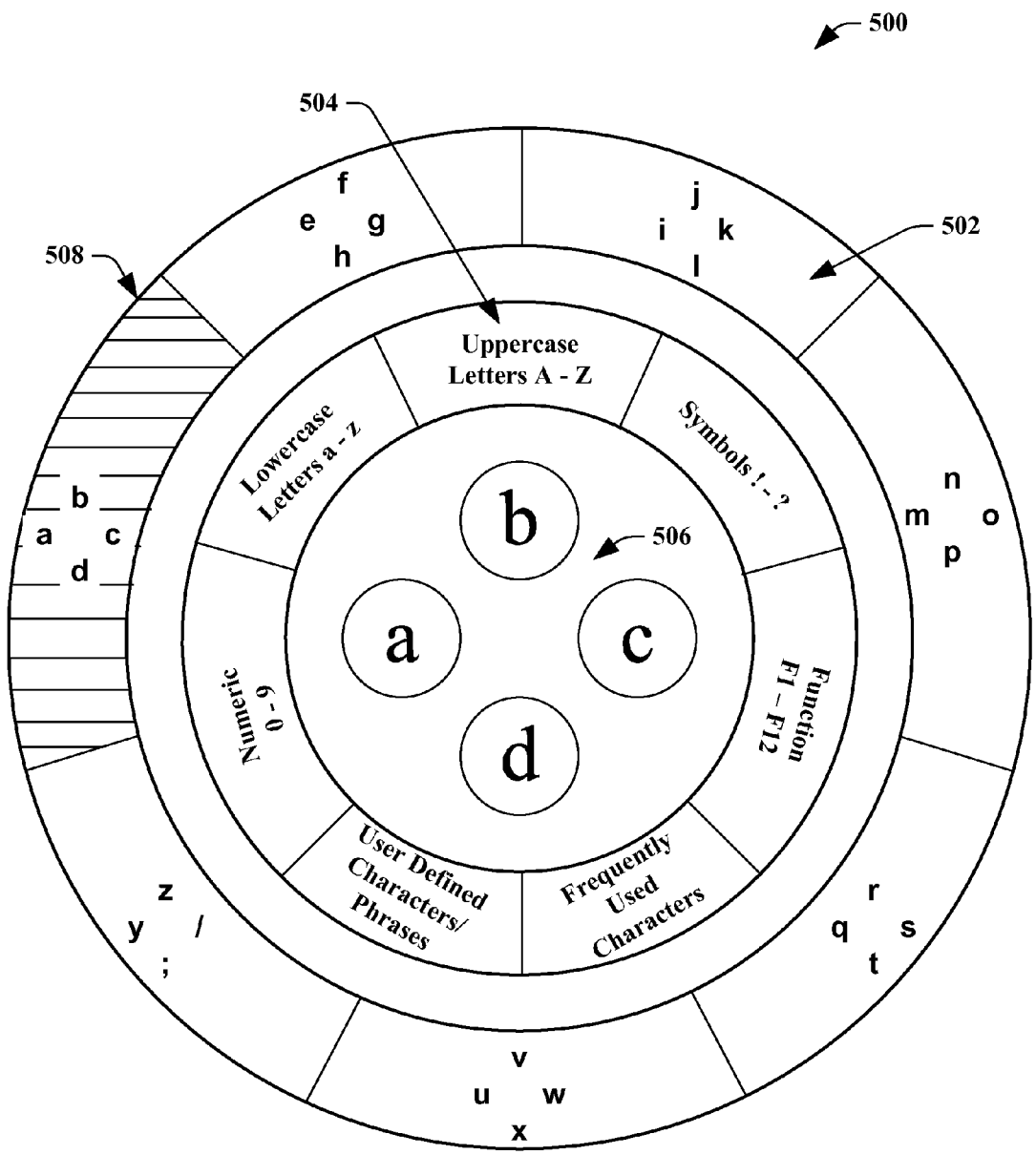
FIG. 5 illustrates a block diagram of exemplary user interface (UI) overlay that facilitates inputting a character while minimizing keystrokes.

FIG. 5 illustrates a UI overlay 500 that facilities inputting a character while minimizing keystrokes. The claimed innovation can utilize an analog directional input and at least two or more button inputs for data entry with the UI overlay, wherein such inputs can be associated with a plurality and majority of input devices. As stated above, the UI overlay 500 generated by the enhanced input component (not shown) can be utilized by any suitable input device with an analog directional input and at least two button inputs. Thus, for input devices such as a cell phone, button inputs can be a set of numeric keys. It is to be appreciated that the UI overlay 500 depicted is an example and the subject innovation is not to be so limited. In addition, it is to be appreciated that there are a plurality of nuances and/or subtleties that can be employed in connection with the UI overlay 500, thus any such minor tweaks or changes are to be considered within the scope of the claimed subject matter.

The UI overlay 500 can include at least one segmented ring with two or more sectors and/or segments with each segment and/or sector having at least two or more characters. As illustrated, the UI overlay 500 includes two (2) segmented rings with each ring including seven (7) segments and/or sectors and each segment and/or sector of the outer "character-selector" ring having four (4) characters. It is to be appreciated that the UI overlay 500 can include any suitable number of rings, any suitable number of segments and/or sectors, and/or any suitable number of characters within each outer segment and/or sector. For example, the UI overlay can be specifically generated for an input device based on a region, language, and/or available inputs on such device, in which three (3) rings with ten (ten) sectors and two (2) characters in each sector is most efficient (e.g., user preference, user configuration, based on testing data, based on beta results, etc.). It is to be appreciated that the number of characters within a sector and/or segment on the segmented ring can correspond to the number of button inputs (e.g., two characters within a segment, the input device can have two or more button inputs, five characters within a segment, the input device can have five or more button inputs, etc.).

For example, the UI overlay 500 can include three regions such as an outer ring region 502, an inner ring region 504, and a button display region 506. It is to be appreciated and understood that the selection input for a segment and/or a sector on the segmented ring can be designated to an analog directional input. In this example, the outer ring region 502 can be assigned to a first analog directional input on the input device and the inner ring region 502 can be assigned to a second directional input on the input device. The outer ring region 502 can include seven sectors and/or segments with characters populated therein, wherein each sector and/or segment can include four (4) characters. As illustrated, the outer ring 502 includes the standard English alphabet characters in lower case as well as the characters "/" and ";." The inner ring region 504 can include seven sectors and/or segments that allow the selection of a character set. For example, the inner ring region 504 includes the following character sets: uppercase letters A-Z; lowercase letters a-z; numbers 0-9; symbols !-?; functions F1-F12; user defined characters/phrases; and/or frequently used characters.

The button display region 506 can include a display of available button inputs related to the input device in which the UI overlay 500 is specific toward. As depicted, the button display region 506 includes four button graphical representations substantially similar to a set of primary button inputs on an input device. It is to be appreciated and understood that there can be any suitable number of button graphical representations that correlate to the number of button inputs on an input device. Thus, although four button graphical representations are illustrated, there can be two or more button graphical representations in the button display region 506 as well as two or more button inputs on the input device. As illustrated, the outer ring region 502 has been selected by an analog directional input to select the sector and/or region 508, in which the button display region 506 illustrates the corresponding character representation for button inputs (e.g., "a," "b," "c," and "d"). Thus, a button input from the input device will correspond to one of the characters within such sector and/or segment selected.

In addition, the UI overlay 500 is compact and small in size to reduce the real estate necessary for displaying such UI overlay on a display. Conventionally, data input overlays (e.g., virtual keyboards, etc.) are large, bulky, and consume a large portion of a viewing area. As well as being more efficient by allowing data entry with limited keystrokes, the UI overlay 500 can be displayed on a low portion of a display screen to allow the display to be optimally used. For example, the UI overlay 500 can be displayed in a corner of the screen. In addition, it is to be appreciated that the UI overlay 500 can be of any size (e.g., adjustable, default size, re-sizeable, adaptable based on real estate on display, etc.). For example, a UI overlay utilized for entering text in a text chat room may be larger than a UI overlay utilized during online play for a first person shooter video game (e.g., in which a user can input characters during game play).

In general, the UI overlay 500 can include a segmented circle and/or ring with key mappings for the set of primary button inputs. As a user moves the thumb stick (e.g., an analog directional input) in various directions, particular segments can be selected (e.g., high-lighted, bolded, colored, etc.) and the keys for that sector/segment can become active keys (e.g., possible inputs).

The inputs on the controller can be converted to text by reading the state of the analog directional input and buttons and then sending the converted character to the focus of the character input, typically a text box or other input stream. In another example, when the analog directional input corresponding to the character region selection is not manipulated, there can be a default set of keys. For instance, the default keys/inputs can be at least one of SPACE, BACKSPACE, DELETE, ESC, CANCEL, ENTER, and/or any other suitable key defined by a user and/or default setting.

Sectors and/or segments can be activated when the analog directional input is pushed beyond a threshold distance. The corresponding segment and/or sector in the direction in which the analog directional input was pushed can be identified and/or selected (e.g., highlighted, bolded, colored, etc.). It is to be appreciated that there is no limitation of forcing the analog directional input to be moved in a circular fashion. Thus, the analog directional input can be moved in any direction at any time. In another example, the sectors and/or segments can be activated with other button inputs from the input device. For instance, a separate button can toggle the function of a single analog stick such as a trigger/shoulder button for navigating the inner ring. In still another example, the second ring can be navigated with a second analog stick. Thus, each ring can be navigated with a respective and corresponding analog stick (e.g., two rings with two analog sticks for navigation).

In one example, a sector and/or segment can be selected by doing a "hit test" based on a magnitude and direction of a vector in which the analog directional input is pushed. For instance, on a cell phone the analog directional input can include eight (8) discrete that can be mapped to the keys and update the UI overlay 500 accordingly. In still another example, upon release of the analog directional input (e.g., default home location), the selected character region can return to the default which is no region selected. In another example, selection of a character set can be done using a disparate analog directional input or other button inputs if only one analog directional input is available. Moreover, the last selected character set can remain selected (e.g., no non-selection default). As discussed, the key mappings and/or character sets can be adjusted for user preference or as needed by cultural/multi-lingual requirements.

Figure 6:
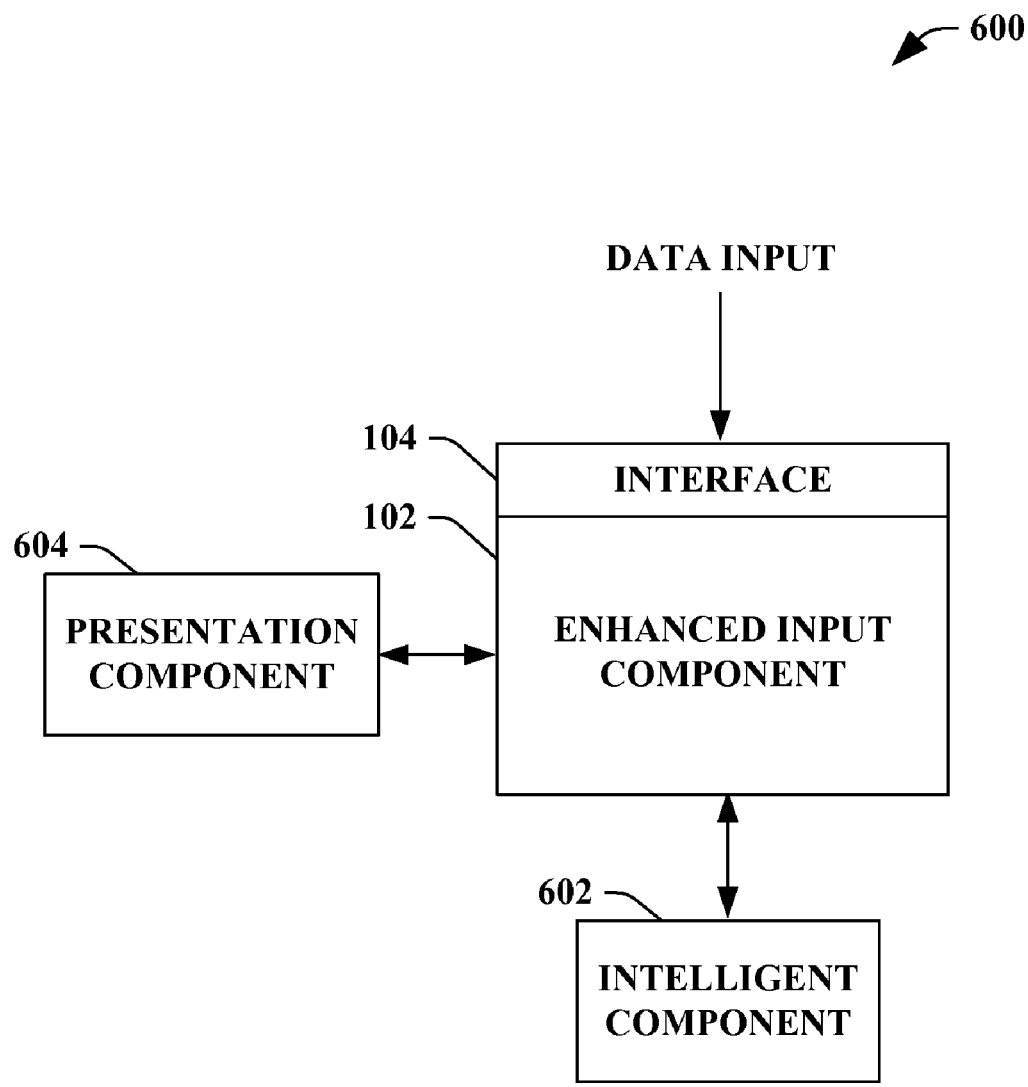
FIG. 6 illustrates a block diagram of an exemplary system that facilitates minimizing keystrokes and/or actions for data entry via an input device utilizing a UI overlay in accordance with the claimed subject matter.

FIG. 6 illustrates a system 600 that employs intelligence to facilitate minimizing keystrokes for data entry via an input device. The system 600 can include the enhanced input component 102 and the interface 104. It is to be appreciated that the enhanced input component 102 and the interface 104 can be substantially similar to respective components and interfaces described in previous figures. The system 600 further includes an intelligent component 602. The intelligent component 602 can be utilized by the enhanced input component 102 to facilitate efficiently inputting data with limited keystrokes for an input device. For example, the intelligent component 602 can infer an input device (e.g., make, model, type, brand, etc.), a grouping of characters, a region/language associated with an input device, an optimal number of rings, an optimal number of segments and/or sectors on a ring, input entry (e.g., predictive text, character, etc.), an optimal character set to employ, default settings, user preferences, default character set, frequently used data input, optimal button input mapping for characters within a segmented ring, analog threshold for sector/segment selection on a ring, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The enhanced input component 102 can further utilize a presentation component 604 that provides various types of user interfaces to facilitate interaction between a user and any component coupled to the enhanced input component 102. As depicted, the presentation component 604 is a separate entity that can be utilized with the enhanced input component 102. However, it is to be appreciated that the presentation component 604 and/or similar view components can be incorporated into the enhanced input component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the enhanced input component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
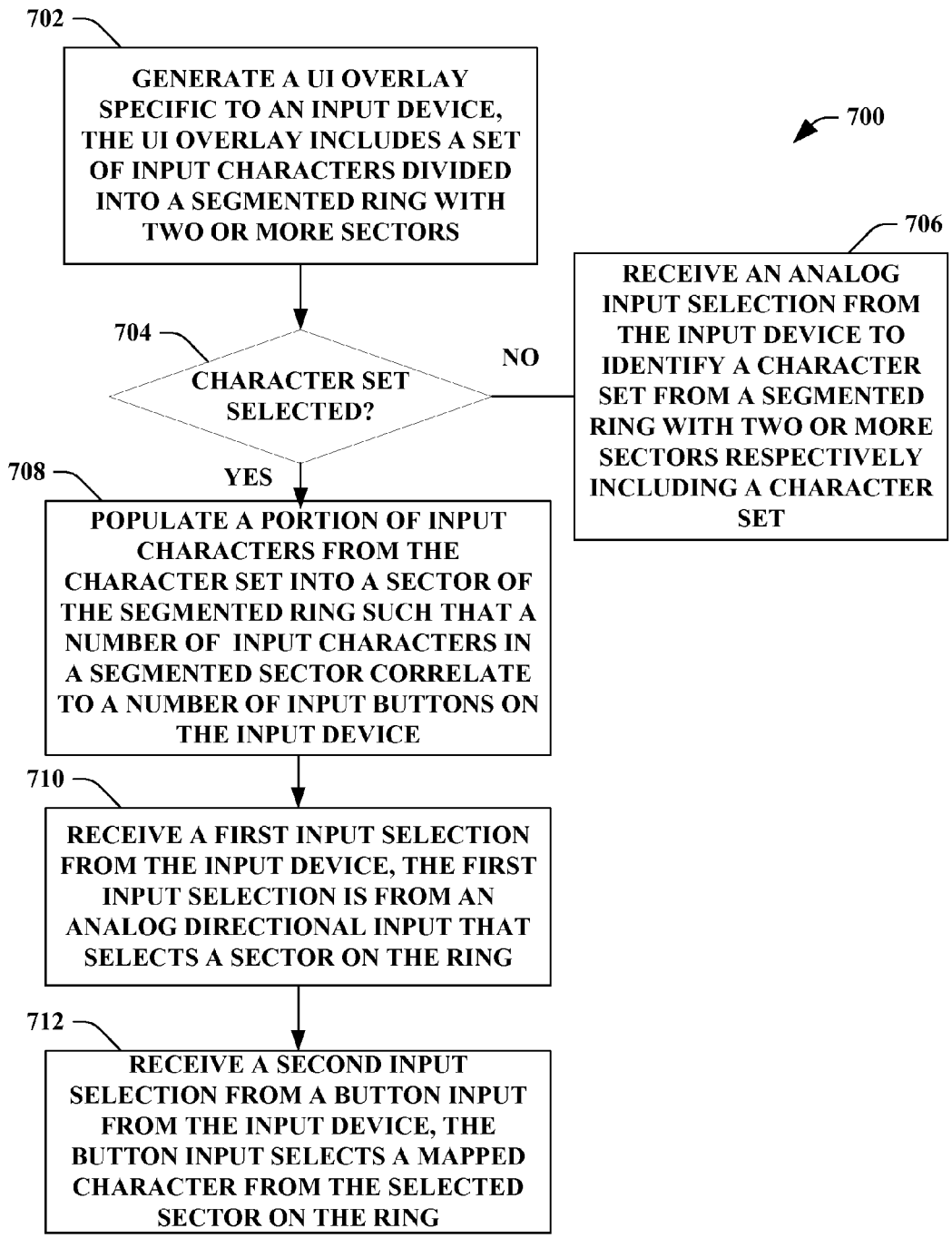
FIG. 7 illustrates an exemplary methodology for efficiently inputting data utilizing an input device.
Figure 8:
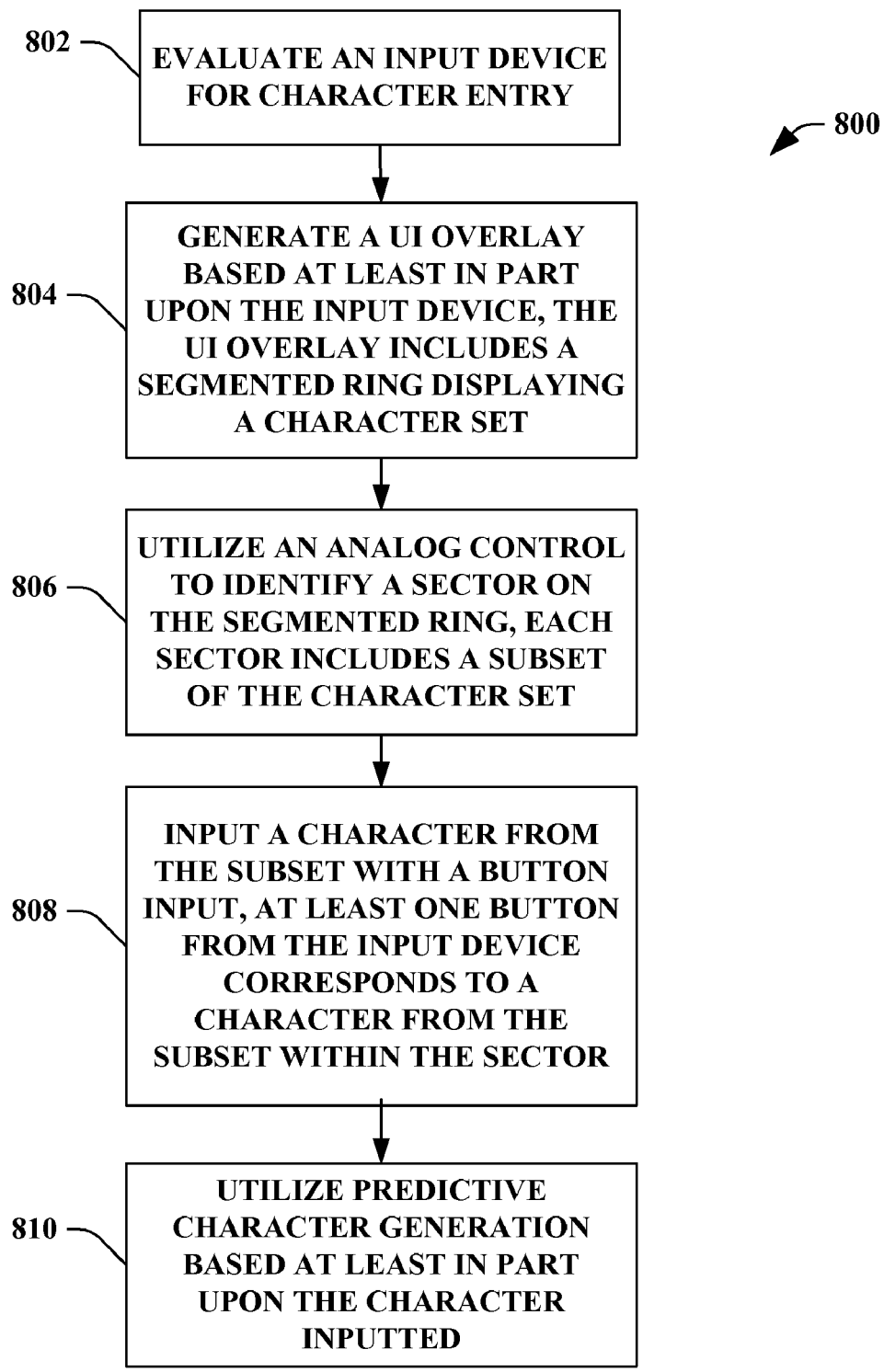
FIG. 8 illustrates an exemplary methodology that facilitates utilizing a UI overlay specific to an input device for data entry.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates efficiently inputting data utilizing an input device. At reference numeral 702, a UI overlay specific to an input device can be generated, wherein the UI overlay can include a set of input characters divided into a segmented ring with two or more sectors. It is to be appreciated that the input device can be any suitable data input device that utilizes one or more analog directional inputs and at least two or more button inputs. For example, the input device can be, but is not limited to, a gaming controller, a controller related to a gaming console, a keypad, an input device with an analog input and at least two button inputs, steering wheel gaming controller, a mobile device, a mobile communication device, a cellular phone, a handheld, a portable gaming device, a handheld gaming device with incorporated controller, etc. In addition, the character input can be any suitable character that can be inputted as a data entry via the input device. For instance, the character can be a letter, a number, a symbol, etc. in any suitable language such as English, Spanish, Japanese, Chinese, Latin, Greek, French, German, Dutch, Arabic, Russian, Italian, Portuguese, Scottish, Hebrew, Korean, Thai, etc.

At reference numeral 704, a determination is made as to whether a character set has been selected. For example, the character set can be a default setting in which particular characters are populated in a sector(s) of the segmented ring. If the character set is not selected, the methodology 700 can continue to reference numeral 706. At reference numeral 706, an analog input selection from the input device can be received in order to identify a character set from a segmented ring with two or more sectors respectively including a character set. In other words, an analog input can select a character set within a sector on a segmented ring. If a character set is selected (e.g., by default setting or by an active selection, etc.), the methodology 700 can continue to reference numeral 708.

At reference numeral 708, a portion of input characters from the selected character set can be populated into at least one sector of the segmented ring such that a number of input characters in a segmented sector correlate to at least a number of input buttons on the input device. In other words, the number of input buttons on an input device can be equal to or greater than the number of input characters within a segment and/or sector. It is to be appreciated that one or more sectors of the segmented ring can be populated with input characters from the pre-identified character set. For instance, if lowercase English alphabet was the character set, each sector on the segmented ring can include a portion of such character set, wherein the number of characters in each sector is less than the number of input buttons from the input device. For example, if an input device included ten (10) available button inputs, the segments and/or sectors can include up to ten (10) characters. In another example, the segmented ring can be divided into seven (7) sectors and/or segments, wherein each segment and/or sector can include four (4) characters (e.g., which correlates to an input device having at least four button inputs).

At reference numeral 710, a first input selection from the input device can be received in which the first input selection is from an analog directional joystick that selects a sector on the ring. In other words, an analog directional input can be received from the input device, in which the direction of the input identifies a sector and/or segment on the segmented ring having two or more characters. It is to be appreciated that the analog directional input can be received from any suitable analog stick, analog directional stick, a thumb stick, a joystick, etc. At reference numeral 712, a second input selection from a button input can be received, wherein the button input selects a corresponding/mapped character from the selected sector/segment on the segmented ring.

FIG. 8 illustrates a method 800 for utilizing a UI overlay specific to an input device for data entry. At reference numeral 802, an input device for character entry can be evaluated. For example, the input device can be a gaming controller, a controller related to a gaming console, a keypad, an input device with an analog input and at least two button inputs, steering wheel gaming controller, a mobile device, a mobile communication device, a cellular phone, a handheld, a portable gaming device, a handheld gaming device with incorporated controller, etc. The input device can be evaluated to identify at least one of an available analog directional input, an available button input, a region, a language, a portion of geographic data, a character set, a user preference, a user configuration, etc.

At reference numeral 804, a UI overlay can be generated based at least in part upon the input device, wherein the UI overlay can include a segmented ring displaying at least one character set. It is to be appreciated that the character set can be any suitable set of characters that can be displayed for data entry. At reference numeral 806, an analog control related to the input device can be utilized to identify a sector on the segmented ring in which each sector can include a subset of the character set. At reference numeral 808, a character from the subset can be inputted with a button input from the input device, wherein at least one button from the input device corresponds to a character from the subset within the sector. At reference numeral 810, predictive character generation can be utilized based at least in part upon the character selected with the button input from the button input.

Figure 9:
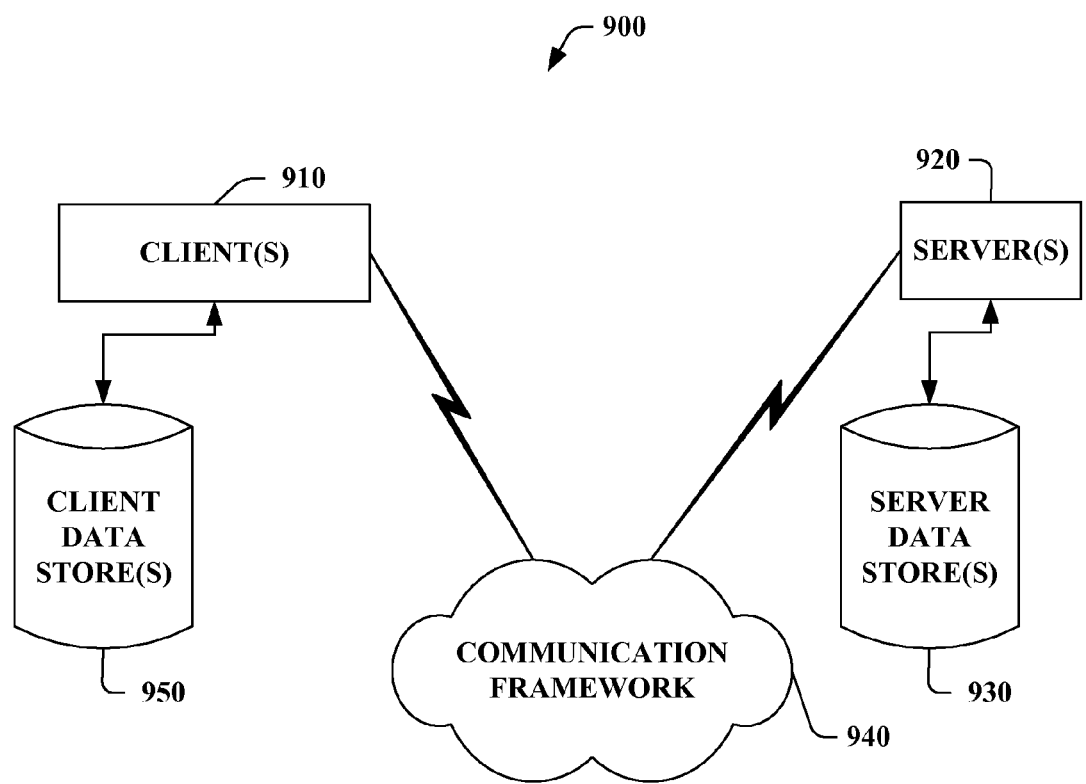
FIG. 9 illustrates an exemplary networking environment, wherein the novel aspects of the claimed subject matter can be employed.
Figure 10:
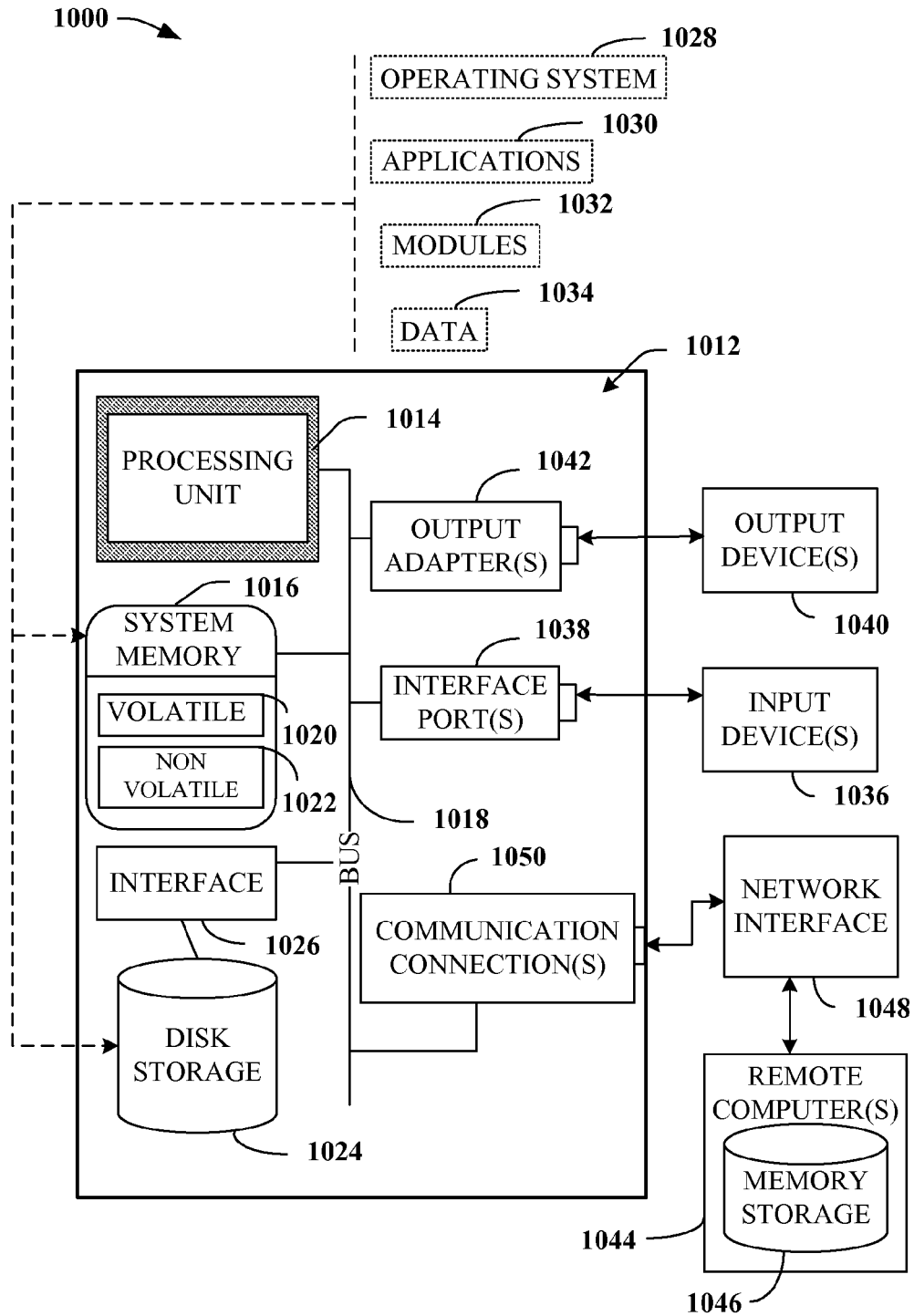
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an enhanced input component that facilitates entering a character via an input device with minimum keystrokes, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates entering a character via an input device with minimum keystrokes to enhance efficiency, comprising:
    an interface that receives a portion of input data from an input device, the input data is at least one of an analog input from an analog directional input associated with the input device and a button input from a button associated with the input device;
    an enhanced input component that utilizes a user interface (UI) overlay corresponding to the input device to select a character, the UI overlay includes a segmented ring with two or more sectors with each sector having two or more characters; and
    the enhanced input component enters a character for data entry based upon an analog directional input that selects a sector on the segmented ring and a button input that selects a corresponding character within the segment.

2. The system of claim 1, the input device is at least one of a gaming controller, a controller related to a gaming console, a keypad, an input device with an analog directional input and at least two button inputs, a steering wheel gaming controller, a mobile device, a mobile communication device, a cellular phone, a handheld, a portable gaming device, or a handheld gaming device with an incorporated controller.

3. The system of claim 1, the UI overlay maps a character for data entry to at least one of the analog directional input or the button input on the input device.

4. The system of claim 1, further comprising a number of characters within the sector on the segmented ring are less than or equal to a number of button inputs on the input device.

5. The system of claim 4, the input device includes four button inputs, the number of characters within the sector on the segmented ring is four, and the segmented ring includes seven sectors.

6. The system of claim 1, the enhanced input component generates the UI overlay based at least in part upon a characteristic of the input device.

7. The system of claim 1, further comprising a display component that provides a portion of graphical representation of the UI overlay for interaction with the input device.

8. The system of claim 1, further comprising a grouping component that evaluates a portion of data in order to ascertain at least one of a number of segmented rings for the UI overlay, a number of sectors to divide the segmented ring, or a number of characters to populate within a sector.

9. The system of claim 8, the grouping component evaluates the portion of data related to at least one of the input device, a geographic region, a language associated with a geographic region, geographic data, a user selected language, a character set, a button input related to the input device, a user preference, or a user's configuration.

10. The system of claim 8, further comprising an overlay generator that creates a user interface (UI) overlay in accordance with the ascertained specifics from the grouping component.

11. The system of claim 1, further comprising a predictive component that provides a suggested character input based at least in part upon the entered character.

12. The system of claim 11, the predictive component suggests at least one of a character, a word, a phrase, a portion of a sentence, or a symbol.

13. The system of claim 1, the UI overlay includes an additional segmented ring with each sector populated with a selectable character set, the additional segmented ring is activated for navigation with a button input from the input device.

14. The system of claim 13, the selectable character set includes a set of characters, the set of characters is at least one of a set of lower case characters, a set of uppercase characters, a set of symbols, a set of functions, a set of numbers, a set of user defined characters, a set of user defined phrases, a set of frequently used characters, a set of frequently used phrases, or a set of frequently used words.

15. The system of claim 14, the character set is selected based upon at least one of an analog directional input from the input device, a button input from the input device, or an analog directional input corresponding to a thumb stick from the input device.

16. A computer-implemented method that facilitates data entry, comprising:
- generating a UI overlay specific to an input device, the UI overlay includes a set of input characters divided into a segmented ring with two or more sectors;
- populating a portion of input characters into a sector of the segmented ring such that a number of input characters in a segmented sector correlate to a number of input buttons on the input device;
- receiving a first input selection from the input device, the first input selection is from an analog directional input that selects a sector on the segmented ring; and
- receiving a second input selection from a button input from the input device, the button input selects a mapped character from the selected sector on the segmented ring.

17. The method of claim 16, further comprising:
- evaluating the input device to collect a portion of data related to at least one of an available data input, a geographic region, a language, or a user setting; and
- utilizing a predictive character generator based at least in part upon the character inputted.

18. The method of claim 16, the input device is at least one of a gaming controller, a controller related to a gaming console, a keypad, an input device with an analog directional input and at least two button inputs, a steering wheel gaming controller, a mobile device, a mobile communication device, a cellular phone, a handheld, a portable gaming device, or a handheld gaming device with an incorporated controller.

19. The method of claim 16, further comprising utilizing the UI overlay to map a character to at least one of an analog directional input or a button input on the input device.

20. A computer-implemented system that facilitates data entry with an input device, comprising:
- means for receiving a portion of input data from an input device, the input data is at least one of an analog input from an analog directional input associated with the input device and a button input from a button associated with the input device;
- means for utilizing a user interface (UI) overlay corresponding to the input device to select a character, the UI overlay includes a segmented ring with two or more sectors with each sector having two or more characters; and
- means for entering a character for data entry based upon an analog directional input that selects a sector on the segmented ring and a button input that selects a corresponding character within the segment.

* * * * *